Patented Nov. 26, 1935

2,022,011

UNITED STATES PATENT OFFICE 2,022,011

RESINOUS COMPOSITION

Caryl Sly, Wilmington, Del., assignor to E. I. du Pont de Nemours & Company, Wilmington, Del., a corporation of Delaware No Drawing. Application May 3, 1932, Serial No. 609,027

12 Claims. (Cl. 260—8)

This invention relates to compositions comprising resins and cellulose derivatives, and more particularly to an improved method for incorporating cellulose derivatives into polyhydric alcohol-polybasic acid resins during their formation in such a way that the cellulose derivative enters into chemical combination with the resin, or is more closely associated therewith than is the case when the resin is mechanically mixed with the cellulose derivative.

The advantages of mixing polyhydric alcohol-polybasic acid resins with various cellulose derivatives in the formulation of lacquers and enamels in order to obtain smooth, lustrous, fast drying finishes have been recognized and applied commercially. Of the cellulose derivatives proposed heretofore nitrocellulose only has been extensively combined with polyhydric alcohol-polybasic acid resins, the use of other derivatives such as benzyl cellulose, ethyl cellulose, and especially cellulose acetate, being restricted because of limited compatibility with the polyhydric alcohol-polybasic acid resin. This is particularly true in the higher ratios of resin to cellulose derivatives, such ratios being especially desirable from the standpoint of durability. The inability to obtain satisfactory films by the prior practice of combining cellulose derivatives of the type just mentioned with polyhydric alcohol-polybasic acid resins has been a marked drawback to the art. While nitrocellulose may be incorporated into the resins by the usual methods to obtain more or less satisfactory compositions with respect to compatibility, these nitrocellulose compositions are, however, frequently undesirable because of their inflammable, unstable, and generally hazardous nature. The prior method of incorporating cellulose derivatives with polyhydric alcohol-polybasic acid resins has been concerned with the mechanical or physical mixing of the cellulosic compound with the polyhydric alcohol-polybasic acid resin, conventional methods consisting of blending nitrocellulose or other derivatives with the finished resin by means of mutual solvents. Insofar as I am aware, no method has heretofore been developed for effecting a chemical combination between the cellulose derivative and the polyhydric alcohol-polybasic acid resin, or for effecting such an intimate combination of the ingredients as will result in the improved products disclosed hereinafter.

This invention has as an object improved compositions comprising cellulose derivatives and polyhydric alcohol-polybasic acid resins. A further object is an improved method for incorporating cellulose derivatives into resins of this type. Other objects will appear hereinafter.

Polyhydric alcohol-polybasic acid resins, as well understood by those skilled in the art, may be made by the heat treatment of a polyhydric alcohol and a polybasic acid, modifying ingredients such as fatty acids, monohydric alcohols, etc., usually being included in the reaction mixture in order to impart certain desirable characteristics to the resin film. I have discovered that cellulose derivatives may be successfully incorporated into these resins if the cellulose derivative is first heated with one or more of the acidic ingredients of the resin, preferably the polybasic acid, before the addition of the alcoholic esterifying agents. This primary step of heating together the cellulose derivative and polybasic acid may be carried out by simple fusion of the two substances, but it is preferable, in order to avoid decomposition, first to melt the polybasic acid, then to add the cellulose derivative in small portions with stirring. Where other acidic ingredients are used, it is usually desirable to include these with the polybasic acid, although they may be added later along with the polyhydric alcohol. The use of other acidic ingredients in conjunction with the polybasic acid in this way aids in forming and mixing the melt and in avoiding decomposition due to difficult mixing and local overheating. This is particularly important with large quantities of cellulose acetate. This first step must be carried out at a temperature above the melting point of the polybasic acid and the heating continued above this temperature until the mixture is clear and homogeneous. The proper condensation or combination is effected, as a rule, very shortly after the mixture becomes clear and homogeneous; prolonged heating thereafter should be avoided. The temperature is also preferably kept below 200° C. since heating above this point tends to decompose the cellulose derivative.

It is desirable to add the polyhydric alcohol while the product obtained by heating the polybasic acid and the cellulose derivative is still molten. Any remaining ingredients should be added at the same time or shortly thereafter. These additions should not be made so rapidly that the melt obtained by the first step is caused to solidify, and the polyhydric alcohol is preferably added first. If the product obtained by the first step is allowed to solidify, a white opaque solid (which may be tough or brittle, depending upon the nature and amount of cellulose derivative used in its formation) is obtained. Since this solid is difficult to melt without darkening or decomposition, the other ingredients are preferably added while the reaction mixture of cellulose derivative and polybasic acid is still molten. After the addition of the polyhydric alcohol and the other ingredients, if any, to the molten mixture the final heating step is continued with stirring until a product is obtained of optimum fusibility, solubility, drying time, color, etc. Continued heating tends to lessen the drying time and to produce a less soluble and darker-colored product, an infusible, insoluble stage being eventually reached in a large number of cases. If the product is to be used as a lacquer or enamel, it is necessary to stop the heat treatment before this infusible, insoluble point is reached. The time and temperature necessary for the final or esterification step therefore varies over a considerable range and depends upon the nature of the cellulose derivative, polybasic acid, polyhydric alcohol, and the modifying agents, as well as the proportions thereof. In a great majority of cases the temperature should not rise above 200° C. and the final period of heating should not extend beyond 6–8 hours. The lower temperature limit in general lies above 150° C. The progress of resinification is followed by the acid index of the resin, and the end-point is best determined by carrying the mixture to that acid number corresponding to a resin of optimum physical characteristics, which can in most cases be obtained within the above time and temperature limits.

In preparing our products, it is desirable not to deviate too far from chemically equivalent proportions; however, in some cases, illustrated in certain of the examples, excess alcohol is advisable. As a rule, I make no compensating change of formula for the cellulose derivative, since this substance is usually an essentially neutral ether or ester.

The various modifying agents usually incorporated into the polyhydric alcohol-polybasic acid resins, such as monohydric alcohols, monobasic acids and fatty oils, may be incorporated into the resins prepared as herein disclosed.

As pointed out above, I prefer to incorporate any acidic ingredients other than the polybasic acid by heating them with the polybasic acid and cellulose derivative in the first step of the reaction. While I obtain the best results by the preliminary heating of the cellulose derivative with the polybasic acid, it is possible to satisfactorily incorporate the cellulose derivative into the resin by heating the cellulose derivative with the monobasic acid (or other acidic ingredient that may be used in addition to the polybasic acid) in this preliminary step and then adding the polybasic acid, polyhydric alcohol and the other resin ingredients.

The following examples are illustrative of the method of carrying out my invention.

*Example I*

A simple polyhydric alcohol-polybasic acid resin containing a cellulose derivative chemically combined therewith may be illustrated as follows:

| | Parts by weight |
|---|---|
| Phthalic anhydride | 58.56 |
| Cellulose acetate | 16.66 |
| Glycerol | 24.78 |
| | 100.00 |

The phthalic anhydride is first heated alone to a temperature of 170–175° C. The cellulose acetate is then added in small portions with stirring each portion being allowed to mix thoroughly before further additions. About fifteen minutes is required to add all the acetate and obtain a clear melt. The glycerol is next added dropwise over a period of about thirty minutes, the temperature still being maintained in the range 170–175° C. (Careful addition of the glycerol is advisable in order to avoid troublesome foaming.) The temperature is then raised slowly to 190–195° C. and held at this point for two hours, or until an acid number of 132 is reached. The product when cooled is a clear, somewhat brittle, amber-colored resin containing the cellulose acetate chemically combined therewith. It is soluble in ketones, esters, and alcohol-hydrocarbon mixtures. A clear rapid-drying film can be obtained by flowing from the following solution.

| | Parts by weight |
|---|---|
| Resin of Example I | 35.00 |
| Toluol | 43.33 |
| Ethyl alcohol | 21.67 |
| | 100.00 |

*Example II*

Proceeding from the simple to the more complex resins, I may replace a portion of the polybasic acid by a chemically equivalent amount of a monobasic acid, such as a simple fatty acid, illustrated as follows:

| | Parts by weight |
|---|---|
| Phthalic anhydride | 39.58 |
| Cellulose acetate | 7.41 |
| Oleic acid | 32.66 |
| Glycerol | 20.35 |
| | 100.0 |

The phthalic anhydride and oleic acid are heated together to 160–170° C. The cellulose acetate is next added in small portions with stirring, each portion being allowed to mix thoroughly before further additions. After about ten minutes heating and stirring at 160–170° C. a clear melt is obtained. The temperature is raised to 180° C. and the glycerol added slowly. The mixture is then held at 200° C. for 2 hours or until an acid number of 60–65 is obtained. The product is a soft, sticky, dark brown resin, easily soluble in esters, ketones and aromatic hydrocarbons. A clear compatible film can be obtained by flowing from the following solution:

| | Parts by weight |
|---|---|
| Resin of Example II | 21.0 |
| Acetone | 60.5 |
| Monomethyl ether of glycol | 10.8 |
| Ethyl lactate | 7.7 |
| | 100.00 |

*Example III*

Instead of a simple monobasic fatty acid, illustrated in Example II, I may replace a portion of the polybasic acid by the mixture of acids derived from the saponification of a fatty oil.

| | Parts by weight |
|---|---|
| Phthalic anhydride | 43.45 |
| Cottonseed oil acids | 22.81 |
| Cellulose acetate | 7.42 |
| Glycerol | 26.32 |
| | 100.00 |

The phthalic anhydride and cottonseed oil acids are heated together to 170–175° C. and the cellulose acetate is added to the mixture of acids in small portions with rapid stirring. After fifteen minutes the acetate is all added and a clear melt is obtained. The glycerol is then introduced slowly, the temperature still being maintained at 170–175° C. The final heating is carried out for 2 hours at 200° C. or until an acid number of 55–60 is obtained. A clear, compatible film may be obtained by flowing from the following solution:

| | Parts by weight |
|---|---|
| Resin of Example III | 21.0 |
| Acetone | 60.5 |
| Monomethyl ether of glycol | 10.8 |
| Ethyl lactate | 7.7 |
| | 100.0 |

*Example IV*

Instead of, or in addition to, the fatty oil acids, I may use natural acidic gums as modifiers of the resin into which the cellulose derivative is to be incorporated:

| | Parts by weight |
|---|---|
| Phthalic anhydride | 44.46 |
| Rosin | 19.88 |
| Cellulose acetate | 11.11 |
| Glycerol | 24.55 |
| | 100.00 |

The phathalic anhydride and resin are melted together and carried to about 170–175° C. The cellulose acetate is then added in small portions with stirring, about 20 minutes being necessary to add all the acetate and obtain a clear melt. With the temperature still at about 170° C., the glycerol is added dropwise over a period of 20–30 minutes. Heating is then continued for 2 hours at 190–195° C. or until the resin reaches an acid number of 110–115. A clear rapid-drying film can be obtained from a solution of this resin made up as follows:

| | Parts by weight |
|---|---|
| Resin of Example IV | 40.0 |
| Acetone | 28.0 |
| Monomethyl ether of glycol | 32.0 |
| | 100.0 |

I may use cellulose ethers as well as cellulose esters in my resins, such as the benzyl cellulose and ethyl cellulose of the following examples.

*Example V*

| | Parts by weight |
|---|---|
| Phthalic anhydride | 42.10 |
| Linseed oil acids | 28.15 |
| Benzyl cellulose | 9.09 |
| Glycerine | 20.66 |
| | 100.00 |

The phthalic anhydride and linseed oil acids are heated together to 170° C. and the benzyl cellulose added in small portions with stirring. When a clear melt is obtained (5–10 minutes heating), the glycerol is added dropwise over a period of 20–30 minutes. The temperature is then raised to 195–200° C. and held at this point for 2½ hours or until an acid number of 50 is reached. The product is a clear, easily soluble, dark brown resin. Clear compatible films may be obtained by flowing from the following solution:

| | Parts by weight |
|---|---|
| Resin of Example V | 30.00 |
| Toluol | 70.00 |
| | 100.00 |

*Example VI*

| | Parts by weight |
|---|---|
| Phthalic anhydride | 33.20 |
| Linseed oil acids | 28.32 |
| China-wood oil acids | 11.33 |
| Ethyl cellulose | 9.09 |
| Glycerol | 18.06 |
| | 100.00 |

The phthalic anhydride, linseed oil acids, and China-wood oil acids are melted together and carried to 170–175° C., the ethyl cellulose then being added in small portions with stirring. To the clear melt, still at 170–175° C., the glycerol is added dropwise (to avoid foaming) over a period of about 25 minutes. The temperature is then raised to 195–200° C. and maintained at this point for 2 hours or until an acid number of 50–55 is obtained. The product is a clear, soft, easily soluble, dark brown resin. Clear compatible films may be obtained by flowing from the following solution:

| | Parts by weight |
|---|---|
| Resin | 40.0 |
| Acetone | 28.0 |
| Monomethyl ether of glycol | 32.0 |
| | 100.0 |

Variations in the method of conducting the reaction will occur to those skilled in the art. Thus, the process can be carried out in open or closed vessels of glass, enamel, or of various metals such as iron, aluminum, monel, etc., with or without the presence of holding agents such as urea, and/or of esterification catalysts such as sulfuric acid. An atmosphere of an inert gas such as nitrogen or carbon dioxide tends to produce lighter-colored products. Frequently reduced or increased pressures are advantageous. Mechanical agitation is highly advisable, particularly in the first step, and can be accomplished by stirring or blowing with the inert gas, preferably by the former. Auxiliary condensing systems, such as a short air-cooled reflux condenser, which will allow the water of reaction to escape but retain for the most part any volatile resin ingredients, are often useful. I may also carry out the resinification in the presence of a solvent for the resin which is non-reactive toward the resin and the components thereof and adjust the temperature of reaction (which is approximately the boiling point of the solvent) by applying various pressures to the system. In this case vapors of the solvent and water of reaction are conveniently passed through a downward condenser, the water then being separated from the solvent by chemical or mechanical means and the latter returned continuously to the reaction vessel. Such non-reactive solvents are aromatic hydrocarbons or mixtures thereof, chlorobenzene, dichloroethyl-ether, menthane, cyclohexanone, etc.

As simple fatty acid modifying agents for the new resins, I may use such acids as stearic, butyric, lauric, etc., in addition to oleic acid. Other fatty oil acids in addition to those of the examples (linseed, China-wood, and cottonseed oil acids) include the acids obtained from such oils as perilla, soya bean, coconut, fish oils, etc. A portion of the polybasic acid can also be replaced by aromatic monobasic acids, such as salicylic and benzoic acids.

Among the suitable monohydric alcohol modifying agents that may replace a portion of the polyhydric alcohol there may be mentioned butyl, lauryl, benzyl, cyclohexyl, ethoxyethoxyethyl, butoxyethyl, aliphatic alcohol mixtures, etc. The monohydric alcohols may be aliphatic or aromatic, or any mixture of monohydric alcohols; the monobasic acids may be one or more aromatic acids, simple fatty acids, fatty oil acids, natural resinic acids, or mixtures thereof; the fatty oil modifying agent may be one or more drying, semi-drying, or non-drying oils, or mixtures thereof.

Instead of rosin, I may use as modifying agents other gums, either in the natural or combined state, such as Congo, kauri, pontianic, and the ester gums, the latter being obtained by heating the natural gums with alcohols such as glycerol and the glycols. Acidic materials separated from the natural gums, such as abietic acid, can also be used instead of the raw gum. Good results can be obtained with or without the presence of a fatty oil in addition to the natural gum. I may incorporate the fatty oils directly into the resin by the alcoholysis method instead of first saponifying the fatty oil to the oil acids. With the possible exception of castor oil, it is usually preferred to incorporate the oil by this method which consists in first heating the oil and polyhydric alcohol together in the presence of catalysts such as sodium hydroxide or litharge and then reacting this product with that obtained by heating together the cellulose derivative and polybasic acid.

The present invention may be practiced with practically any type of cellulose derivative. In addition to the cellulose esters and ethers given in the examples, I may use such esters as the crotonate, the benzoate, and the furoate or such ethers as butyl, allyl, and crotyl cellulose. Those cellulose derivatives which are most applicable to my invention are those in which at least one hydrogen of a hydroxyl group has been replaced by an organic radical. Nitrocellulose, which is an ester of an inorganic acid, is satisfactorily used in the present process but its use is not usually recommended because of its generally hazardous nature.

I prefer to use glycerol as the polyhydric alcohol and phthalic anhydride as the polybasic acid, but other polyhydric alcohols and polybasic acids known by those skilled in the manufacture of resins of this type may be used in the present process. Thus, instead of glycerol there may be used ethylene glycol and its higher homologs (e. g. propylene glycol), diethylene glycol and other polyglycols, polyglycerols, pentaerythritol, triethanolamine, polyvinyl alcohol, polyhydric alcohol alkyl or aryl ethers such as monobenzylin, etc., or mixtures thereof. Instead of phthalic anhydride, I may employ as polybasic acids one or more of such acids as succinic, adipic, sebacic, fumaric, itaconic, tartaric, citric, dilactylic, thiodilactylic, salicyl-acetic, chlorophthalic, diphenic, naphthalic, hexahydrophthalic, quinolinic, pyromellitic, tricarballylic, etc.

The products of this invention are particularly useful in protective coatings, either alone or blended with oils, cellulose derivatives, bitumens, and/or natural gums and other synthetic resins. Pigments, lakes, the usual solvents, driers, plasticizers and anti-oxidants may be used where needed and desired. The improved coating compositions may be applied by the known methods of application such as spraying, air-drying, baking, etc.

My new compositions may also be used as binders; cements; molding plastics; impregnating and coating agents for cloth, paper, wood pulp, and porous materials in general; the sandwiching material or adhesive therefor in the manufacture of safety glass, and binders for cellulose acetate in the preparation of laminated products.

The advantages of coating compositions prepared in accordance with the present process as compared to those prepared by the method of the prior art will be apparent from the following:

A resin was prepared from the ingredients used in Example I by heating 70.3 parts by weight of phthalic anhydride with 29.7 parts by weight of glycerol for 4 hours at 190–200° C., or to an acid number of 130. An attempt was made to prepare a cellulose acetate lacquer by dissolving 29.17 parts by weight of this resin in a solution consisting of 5.83 parts by weight of cellulose acetate, 43.33 parts by weight of toluol and 21.67 parts by weight of ethyl alcohol. A clear film of this resin, thus combined with cellulose acetate in accordance with the prior art method, could not be obtained. In this case, as in Example I, the proportion of glycerol and phthalic anhydride was the same; solvents and proportions thereof were the same; and the quantity of cellulose acetate was 20% of the combined weight of phthalic anhydride and glycerol in the present case and was 20% of the weight of the resin ingredients (other than cellulose acetate) in Example I. I have similarly compared the resins of the remaining examples with physical mixtures of cellulose derivative and resin, produced in accordance with the usual methods. In all such comparisons, I have used the same solvents and proportions thereof, the same resin ingredients and proportions thereof, and the same cellulose derivative, and have carried the resins in the two cases to the same acid number. The percentage of cellulose derivative was also the same in the two cases, being expressed as a certain percentage of the weight of the ingredients (other than the cellulose derivative) in my new resins and the same percentage of the weight of the resin in the prior art mixtures. In the latter mixtures I have found that the films were cloudy, incompatible, or both, and that in some instances a film could not be obtained because of the incompatibility of the mixture itself. My new resins, on the other hand, produce clear, compatible films.

As many apparently widely different embodiments of this invention may be made without departing from the spirit and scope thereof, it is to be understood that I do not limit myself to the specific embodiments thereof except as defined in the following claims.

I claim:

1. The resinous reaction product of a non-cellulosic polyhydric alcohol and the product obtained by heating together an organic polybasic acid and a cellulose derivative.

2. The resinous reaction product of glycerol and the product obtained by heating together phthalic anhydride and a cellulose derivative.

3. The resinous reaction product of a non-cellulosic polyhydric alcohol and the product obtained by heating together an organic polybasic acid, an organic monobasic acid, and a cellulose derivative in which at least one hydrogen of a hydroxyl group has been replaced by an organic radical.

4. The resinous reaction product set forth in claim 2 in which the cellulose derivative is selected from the class consisting of cellulose acetate, benzyl cellulose and ethyl cellulose.

5. A process which comprises heating a cellulose derivative with an organic polybasic acid to a temperature above the melting point of the acid, and heating the reaction product thus obtained with a non-cellulosic polyhydric alcohol until resinification takes place.

6. A process which comprises heating a cellulose derivative with phthalic acid above the melting point of the acid, and heating the reaction product thus obtained with glycerol until resinification takes place.

7. A process which comprises heating a fatty oil with a non-cellulosic polyhydric alcohol and heating this product with the product obtained by heating a cellulose derivative and an organic polybasic acid.

8. A coating composition comprising a solution in organic solvent of a film forming material, and the resinous reaction product of a non-cellulosic polyhydric alcohol and the product obtained by heating together an organic polybasic acid and a cellulose derivative, said film forming material being selected from the group consisting of cellulose derivatives, resins, and oils.

9. A coating composition comprising a solution in organic solvent of a film forming material, and the resinous reaction product of glycerol and the product obtained by heating together phthalic anhydride and a cellulose derivative, said film forming material being selected from the group consisting of cellulose derivatives, resins, and oils.

10. The resinous reaction product of a non-cellulosic polyhydric alcohol and the product obtained by heating together an organic polybasic acid and a cellulose derivative in which at least one hydrogen of a hydroxyl group has been replaced by an organic radical.

11. The resinous reaction product of glycerol and the product obtained by heating together phthalic anhydride and a cellulose derivative in which at least one hydrogen of a hydroxyl group has been replaced by an organic radical.

12. The resinous reaction product of fatty oil alcoholized with non-cellulosic polyhydric alcohol and the product obtained by heating together an organic polybasic acid and a cellulose derivative in which at least one hydrogen of a hydroxyl group has been replaced by an organic radical.

CARYL SLY.